(12) United States Patent
Matsuda et al.

(10) Patent No.: US 8,456,049 B2
(45) Date of Patent: Jun. 4, 2013

(54) DRIVE APPARATUS

(75) Inventors: Naoki Matsuda, Handa (JP); Masashi Yamasaki, Obu (JP)

(73) Assignee: Denso Corporation, Kariya (JP)

( * ) Notice: Subject to any disclaimer, the term of this patent is extended or adjusted under 35 U.S.C. 154(b) by 220 days.

(21) Appl. No.: 13/113,309

(22) Filed: May 23, 2011

(65) Prior Publication Data

US 2011/0285225 A1 Nov. 24, 2011

(30) Foreign Application Priority Data

May 21, 2010 (JP) .................................. 2010-117688

(51) Int. Cl.
*H02K 5/18* (2006.01)
(52) U.S. Cl.
USPC ................................ 310/71; 310/89; 180/444
(58) Field of Classification Search
USPC ..................... 310/71, 89; 180/443, 444, 446
See application file for complete search history.

(56) References Cited

U.S. PATENT DOCUMENTS

| 6,429,553 | B1* | 8/2002 | Taniguchi et al. | .......... | 310/67 R |
| 6,548,972 | B2 | 4/2003 | Takagi | | |
| 6,695,091 | B2* | 2/2004 | Achenbach et al. | .......... | 180/444 |
| 7,414,339 | B2 | 8/2008 | Kitamura et al. | | |
| 7,667,971 | B2 | 2/2010 | Tominaga et al. | | |
| 7,886,865 | B2 | 2/2011 | Sekine et al. | | |
| 7,932,651 | B2 | 4/2011 | Fujimoto et al. | | |
| 2009/0120712 | A1* | 5/2009 | Kashimoto et al. | .......... | 180/444 |

FOREIGN PATENT DOCUMENTS

| CN | 2909791 | | 6/2007 |
| JP | 11-356006 | | 12/1999 |
| JP | 2000-078798 | A | 3/2000 |
| JP | 2005-304203 | | 10/2005 |
| JP | 2008-174097 | A | 7/2008 |
| JP | 2008-193872 | A | 8/2008 |
| JP | 2008-290615 | A | 12/2008 |
| JP | 4252486 | B2 * | 4/2009 |

OTHER PUBLICATIONS

Chinese Office Action dated Sep. 5, 2012, issued in corresponding Chinese Application No. 201110139032.6 with English translation.

* cited by examiner

*Primary Examiner* — Tran Nguyen
*Assistant Examiner* — Naishadh Desai
(74) *Attorney, Agent, or Firm* — Nixon & Vanderhye PC

(57) ABSTRACT

A heat sink is provided on a motor. A power module is provided on the heat sink to switch current supply to motor coils. A control circuit substrate is arranged on the heat sink and connected electrically to the power module. A power circuit substrate is connected electrically to the power module and arranged at an opposite side of the control circuit substrate relative to the heat sink. A control circuit connector is electrically connected to the control circuit substrate. A power circuit connector is electrically connected to the power circuit substrate. The control circuit connector and the power circuit connector are arranged between the control circuit substrate and the power circuit substrate.

17 Claims, 13 Drawing Sheets

DRIVE APPARATUS

CROSS REFERENCE TO RELATED APPLICATION

This application is based on and incorporates herein by reference Japanese patent application No. 2010-117688 filed on May 21, 2010.

FIELD OF THE INVENTION

The present invention relates to a drive apparatus, which has an electric motor and a control unit for controlling driving of the motor.

BACKGROUND OF THE INVENTION

An electric drive apparatus, which assists a vehicle steering operation by a driver, is known conventionally. This drive apparatus has an electric motor and an electronic control unit for controlling the motor. It is disclosed that an electronic control unit is located near an electric motor to reduce size and weight of the drive apparatus (for example, JP 2005-304203A).

According to this conventional technology, a connector is attached to an outside of a housing of the control unit. It is therefore difficult to reduce size of the drive apparatus because of the connector located outside the housing of the control unit.

SUMMARY OF THE INVENTION

It is therefore an object of the present invention to provide a drive apparatus, which is small in size.

According to one aspect of the present invention, a drive apparatus has a motor, a heat sink, a power module, a control circuit wiring part, a power circuit wiring part, a control circuit connector and a power circuit connector. The heat sink is located apart from the motor in an axial direction of the motor. The power module is arranged on the heat sink to switch over current supply to motor coils. The control circuit wiring part is arranged on the heat sink and electrically connected to the power module to supply a control current for controlling the motor. The power circuit wiring part is arranged on the heat sink at a position opposite to the control circuit wiring part and electrically connected to the power module to supply a drive current for driving the motor. The control circuit connector is electrically connected to the control circuit wiring part to input and output the control current. The power circuit connector is electrically connected to the power circuit wiring part to input and output the drive current. The control circuit connector and the power circuit connector are located between the control circuit wiring part and the power circuit wiring part.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENT

Figure 1:
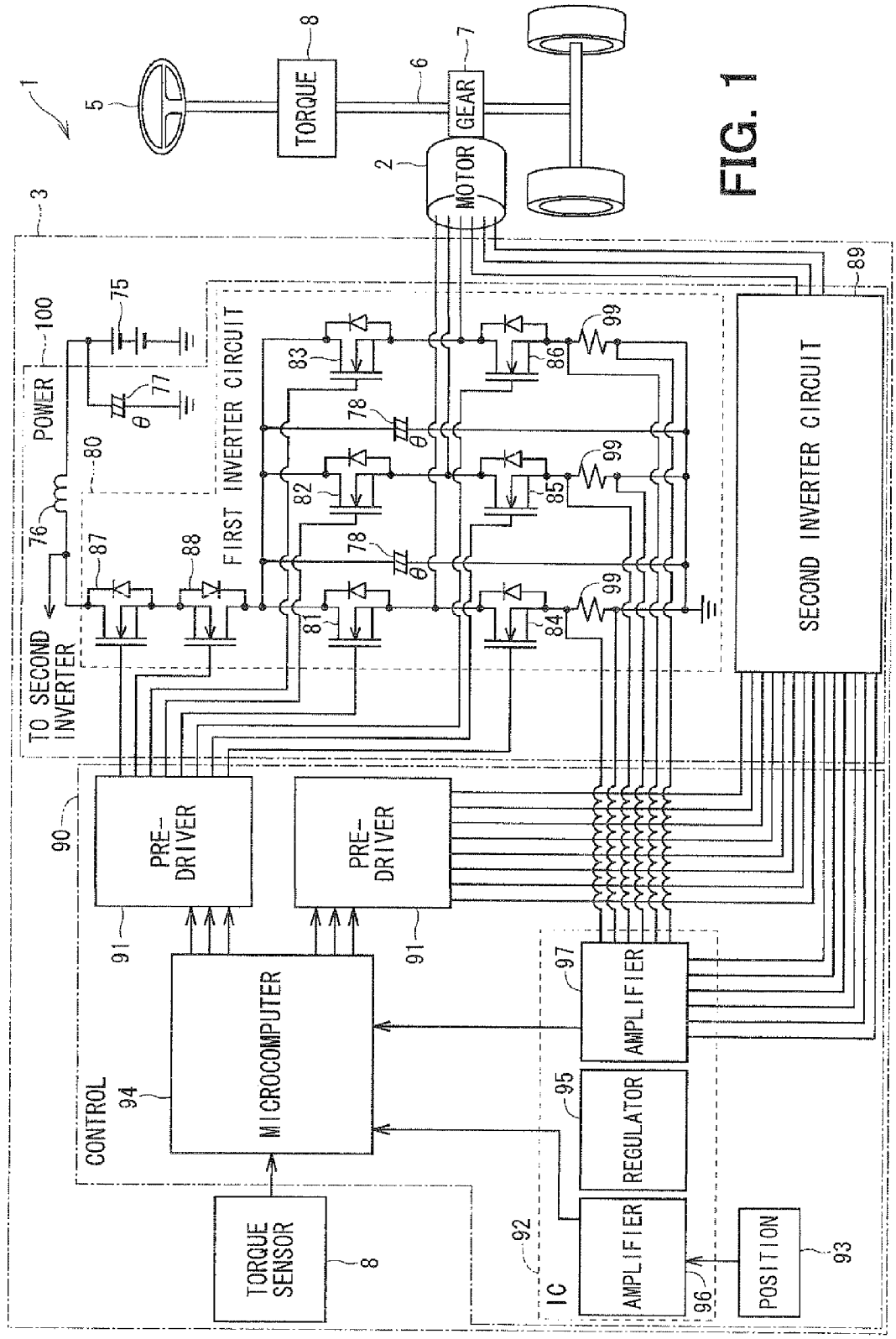
FIG. 1 is a block diagram of a power steering apparatus using a drive apparatus according to a first embodiment of the present invention.

A drive apparatus according to the present invention will be described below with reference to the drawings. In a plurality of embodiments described below, substantially same parts are denoted by same reference numerals to avoid the same description.

First Embodiment

A drive apparatus according to a first embodiment of the present invention is shown in FIG. 1 to FIG. 18 and denoted by reference numeral 1. The drive apparatus 1 is applied to an electric power steering system (EPS). The drive apparatus 1 has an electric motor 2 and an electronic control device 3. The control device 3 has, as exemplified in FIG. 2, a control circuit substrate 40 as a control circuit wiring part, a heat sink 50, a power module 60, a power circuit substrate 70 as a power circuit wiring part, a control circuit connector 49, a power circuit connector 79 and the like.

Electric configuration of the EPS is described first with reference to FIG. 1. The electric configuration described hereunder is applicable to other embodiments. The drive apparatus 1 is used to assist vehicle steering operation by a steering wheel 5 of a vehicle by driving a column shaft 6 to generate rotational torque through a gear 7 attached to the column shaft 6, which is a rotational shaft of the steering wheel 5. Specifically, when the steering wheel 5 is operated by a driver, the drive apparatus 1 assists the steering operation of the driver on the steering wheel 5 by detecting steering torque generated in the column shaft 6 and acquiring vehicle speed information from CAN (Controlled Area Network), which is not shown. The steering torque is detected by a torque sensor 8. It is also possible to use this mechanism for not only assisting steering operation but also other operations depending on different control processing. The other operations have automatic control of the steering wheel 5 such as lane keeping on an expressway, guiding to a parking space in a parking lot and the like.

The motor 2 is a brushless motor, which rotates the gear 7 in forward and reverse directions. The control device 3 controls current supply to the motor 2 and drive operation of the motor 2. The control device 3 has a power circuit 100, which supplies drive currents to the motor 2, and a control circuit 90, which controls driving of the motor 2, that is, supply of the drive currents from the power circuit 100 to the motor 2.

The power circuit 100 has a choke coil 76 provided between a DC power source 75 and a power supply line, a smoothing capacitor 77 and two sets of (first and second) inverter circuits 80 and 89. The inverter circuits 80 and 89 have the same configuration and are respectively molded in the power modules 60, and hence only the inverter circuit 80 is described below. The inverter circuit 80 has MOSFETs (metal-oxide-semiconductor field-effect transistors referred to as FETs) 81 to 86. Each of the FETs 81 to 86 is turned on (conduction) or off (non-conduction) between a source-drain path depending on a gate potential thereof. The FETs 81 to 86 are switching elements.

The FET 81 has a drain connected to the power supply fine side and a source connected to a drain of the FET 84. The FET 84 has a source connected to the ground through a shunt resistor 99. A junction between the FET 81 and the FET 84 is connected to a U-phase coil of the motor 2. The FET 82 has a drain connected to the power supply line side and a source connected to a drain of the FET 85. The FET 85 has a source connected to the ground through a shunt resistor 99. A junction between the FET 82 and the FET 85 is connected to a V-phase coil of the motor 2. The FET 83 has a drain connected to the power supply line side and a source connected to a drain of the FET 86. The FET 86 has a source connected to the ground through a shunt resistor 99. A junction between the FET 83 and the FET 86 is connected to a W-phase coil of the motor 2.

The inverter circuit 80 has power supply relays 87 and 88. The power supply relays 87 and 88 are formed of MOSFETs similar to the FETs 81 to 86. The power supply relays 87 and 88 are provided in series between the FETs 81 to 83 and the power source 75 to interrupt current from flowing to the motor 2 side through the FETs 81 to 86 at the time of occurrence of abnormality.

The shunt resistors 99 are electrically connected between the FETs 84 to 86 and the ground. Currents flowing in the U-phase coil, the V-phase coil and the W-phase coil of the motor 2 are detected by detecting voltages developed by or currents flowing in the shunt resistors 99.

The choke coil 76 and the smoothing capacitor 77 are electrically connected between the power source 75 and the power supply relay 87. The choke coil 76 and the smoothing capacitor 77 form a filter circuit to reduce noise applied from other devices, which share the power source 75, and reduce noise applied from the drive apparatus 1 to other devices, which share the power source 75.

Electrolytic capacitors 78 are electrically connected between power source sides of the FETs 81 to 86 provided at the power supply line side and ground sides of the shunt resistors 99. The electrolytic capacitors 78 assist electric power supply to the FETs 81 to 86 and suppress noise components such as surge voltages by storing electric charge.

The control circuit 90 has a pre-driver 92, a customized IC 92, a position sensor 93 as a rotation detection part and a microcomputer 94. The customized IC 92 has, as functional blocks, a regulator 95, a position signal amplifier 96 and a detection voltage amplifier 97.

The regulator 95 is a stabilizing circuit for stabilizing power supply. The regulator 95 stabilizes electric power supplied to each part. For example, the microcomputer 94 is operated with a predetermined voltage (for example, 5V), which is stabilized by the regulator 95.

A signal from a position sensor 93 is applied to the position signal amplifier 96. The position sensor 93 detects a rotational position of the motor 2 and the rotational position signal is applied to the position sensor signal amplifier 96. The position sensor signal amplifier 96 amplifies and outputs the rotation position signal. The detection voltage amplifier 97 detects voltages of the shunt resistors 99 and amplifies and outputs the terminal voltages of the shunt resistors 99.

The rotation position signal of the motor 2 and the terminal voltages of the shunt resistors 99 are inputted to the microcomputer 94. A steering torque signal is also inputted to the microcomputer 94 from the torque sensor 8 attached to the column shaft 6. The vehicle speed information is inputted to the microcomputer 94 through CAN. The microcomputer 94 controls, based on the steering torque signal and the vehicle speed information, the inverter circuit 80 through the pre-driver 91 in correspondence to the rotation position signal so that the steering operation by the steering wheel 5 is power-assisted in correspondence to the vehicle travel speed. Specifically, the microcomputer 94 controls the inverter circuit 80 by switching over on/off states of the FETs 81 to 86 through the pre-driver 91. Since the gates of six FETs 81 to 86 are connected to six output terminals of the pre-driver 91, the on/off states of the FETs 81 to 86 are switched over by changing the gate voltages by the pre-driver 91.

The microcomputer 94 controls the inverter circuit 80 in accordance with the terminal voltages of the shunt resistors 99, which are inputted from the detection voltage amplifier 97, so that the current supplied to the motor 2 is approximated in a sinusoidal waveform. The microcomputer 94 also controls the inverter circuit 89 in the similar manner as controlling the inverter circuit 80.

Figure 2:
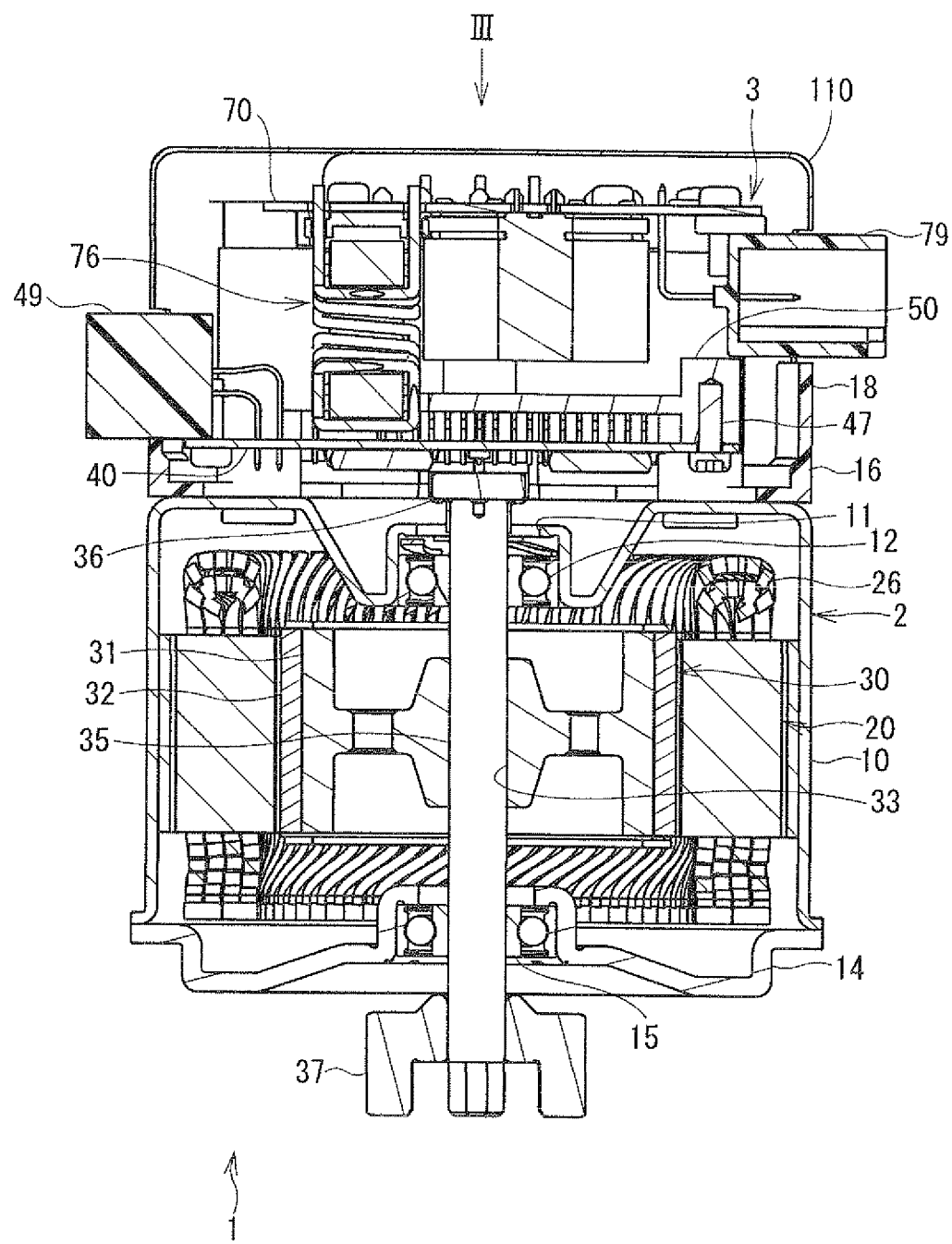
FIG. 2 is a sectional view of the drive apparatus according to the first embodiment of the present invention.

The drive apparatus 1 has such a stack structure shown in FIG. 2 that the motor 2 and the control device 3 are stacked in an axial direction of the motor 2. The control device 3 is located at one end in the axial direction of the motor 2. The motor 2 has a motor case 10, a stator 20, a rotor 30, a shaft 35 and the like.

Figure 3:
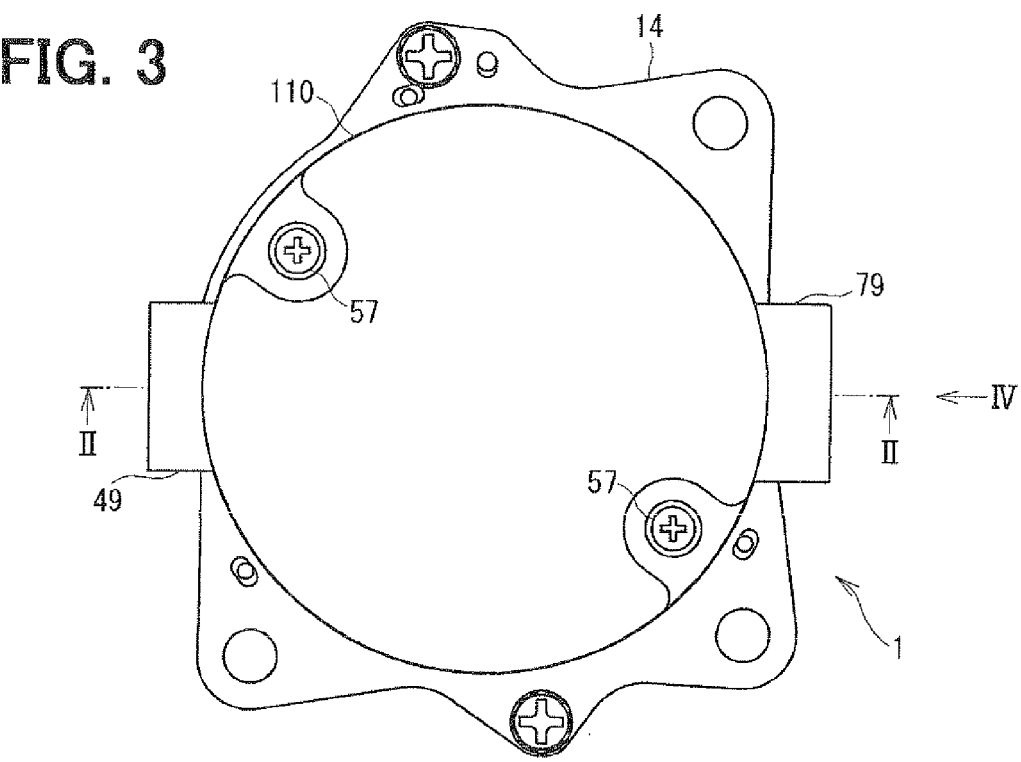
FIG. 3 is a plan view of the drive apparatus according to the first embodiment of the present invention.

The motor case 10 is formed in a cylindrical shape and made of iron or the like. As shown in FIG. 2 and FIG. 3, an end frame 14 made of aluminum is tightly fixed to the motor case 10 at an axial end part, which is opposite to the control device 3, by screws or the like. An opening 11 is provided in the motor case 10 at the axial center of an end part, which is on the control device 3 side. The shaft 35 passes through the opening 11. A resin guide 16 is provided at the end part of the motor case 10, which is at the control device 3 side. The resin guide 16 is formed in substantially an annular shape having its central part, which is open. Six holes 17 are formed in the resin guide 16.

The stator 20 is located inside the motor case 10 in a radial direction. The stator 20 is formed by winding coil wires on a stacked iron core, which is a stack of thin plates of magnetic material. The wires form three coils 26 of U-phase, V-phase and W-phase.

Figure 5:
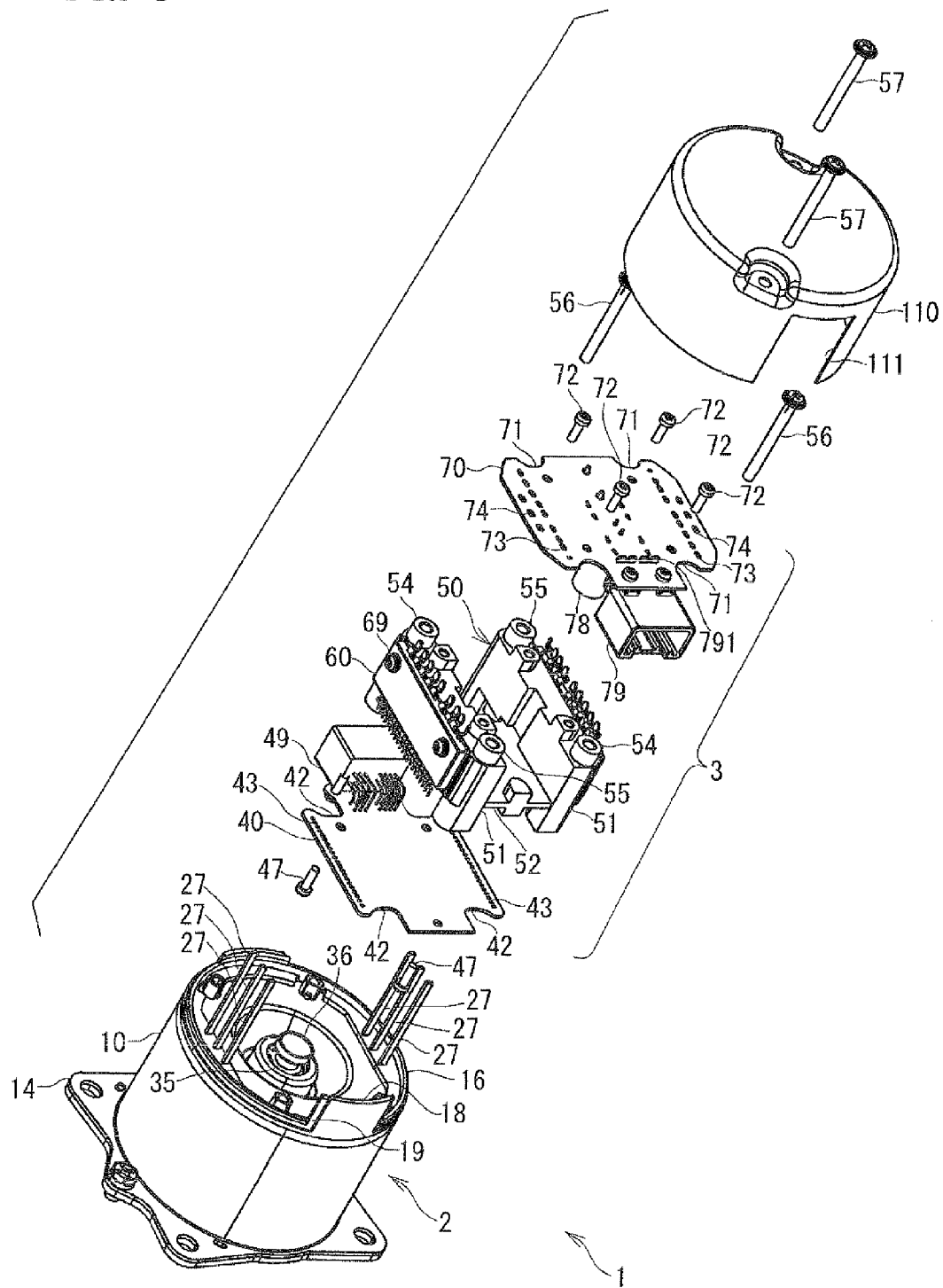
FIG. 5 is an exploded perspective view of the drive apparatus according to the first embodiment of the present invention.
Figure 6:
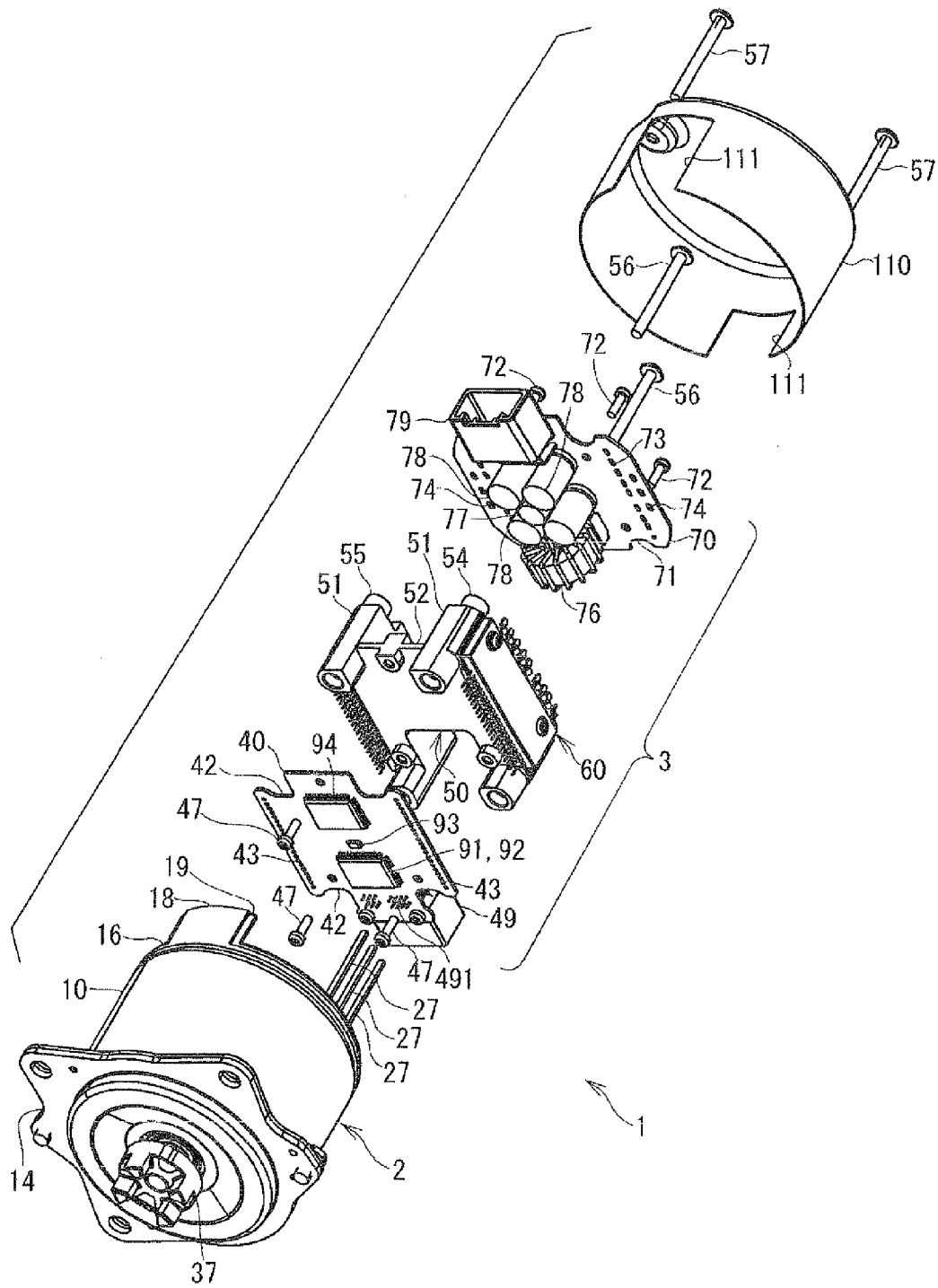
FIG. 6 is another exploded perspective view of the drive apparatus according to the first embodiment of the present invention.

The wires of coils 26 are taken out from six locations to form motor leads 27 as shown in FIG. 5 and FIG. 6. The motor leads 27 pass through six holes 17 formed in the resin guide 16. Thus, the motor leads 27 are positioned by the resin guide 16 and surely insulated from the motor case 10. The motor leads 27 are taken out towards the control device 3 and connected to the power circuit substrate 70 through the control circuit substrate 40 and a radially outside part of the power module 60. That is, the motor leads 27 are located radially outside the power module 60 when viewed in the axial direction of the motor 2.

The rotor 30 is located radially inside the stator 20 as shown in FIG. 2 so that it is rotatable relative to the stator 20. The rotor 30 is formed of magnetic material such as iron in a cylindrical shape. The rotor 30 has a rotor core 31 and permanent magnets 32 located radially outside the rotor core 31. The permanent magnets 32 are arranged so that N-pole and S-pole alternate in a circumferential direction.

The shaft 35 is fixed in a shaft hole 33 formed in the axial center of the rotor core 31. The shaft 35 is supported rotatably by a bearing 12 provided in the motor case 10 and a bearing 15 provided in the end frame 14. Thus the shaft 35 is rotatable with the rotor 30 relative to the stator 20.

Figure 4:
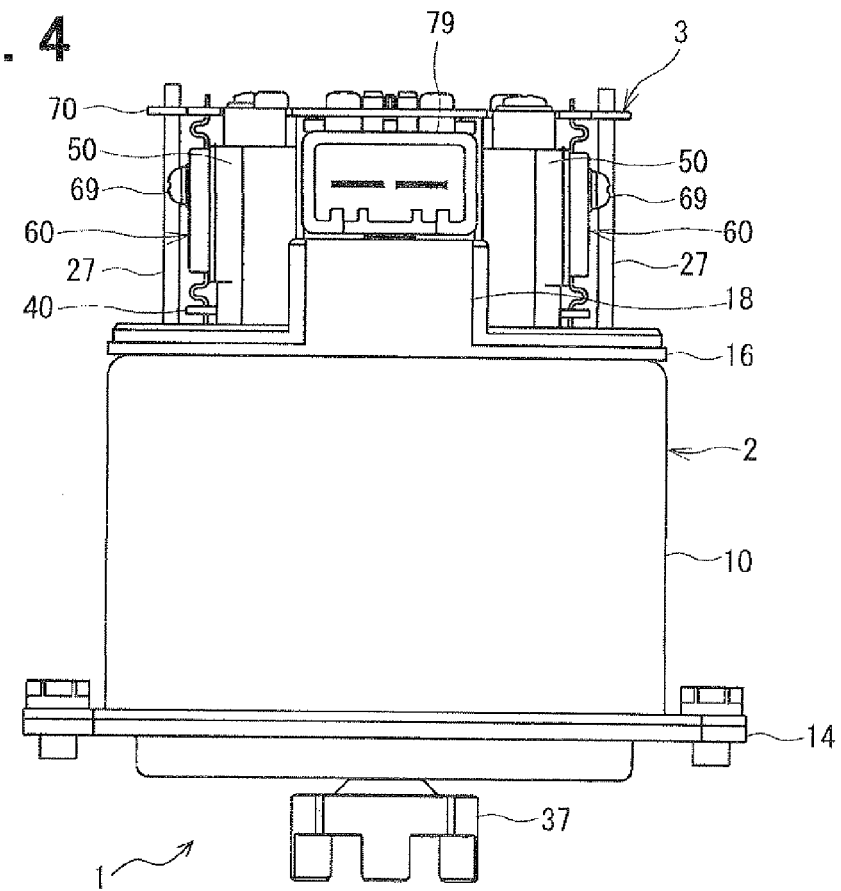
FIG. 4 is a side view of the drive apparatus viewed in a direction IV in FIG. 3 under a condition that a cover is removed.

The shaft 35 has a magnet 36 at its axial end part, which is at the control device 3 side. Since the control device 3 side of the shaft 35 is inserted through the opening 11 of the motor case 10, the magnet 36 fixed to the axial end part of the shaft 35 at the control device 3 side is exposed towards the control device 3 side. The shaft 35 does not pass through the control circuit substrate 40, and the magnet 36 is located near the end surface of the control circuit substrate 40, which is at the motor 2 side. As shown in FIG. 4, the shaft 35 has an output end 37 at a position, which is opposite to the control device 3 relative to the motor case 10, for driving the gear 7 of the column shaft 6.

Figure 7:
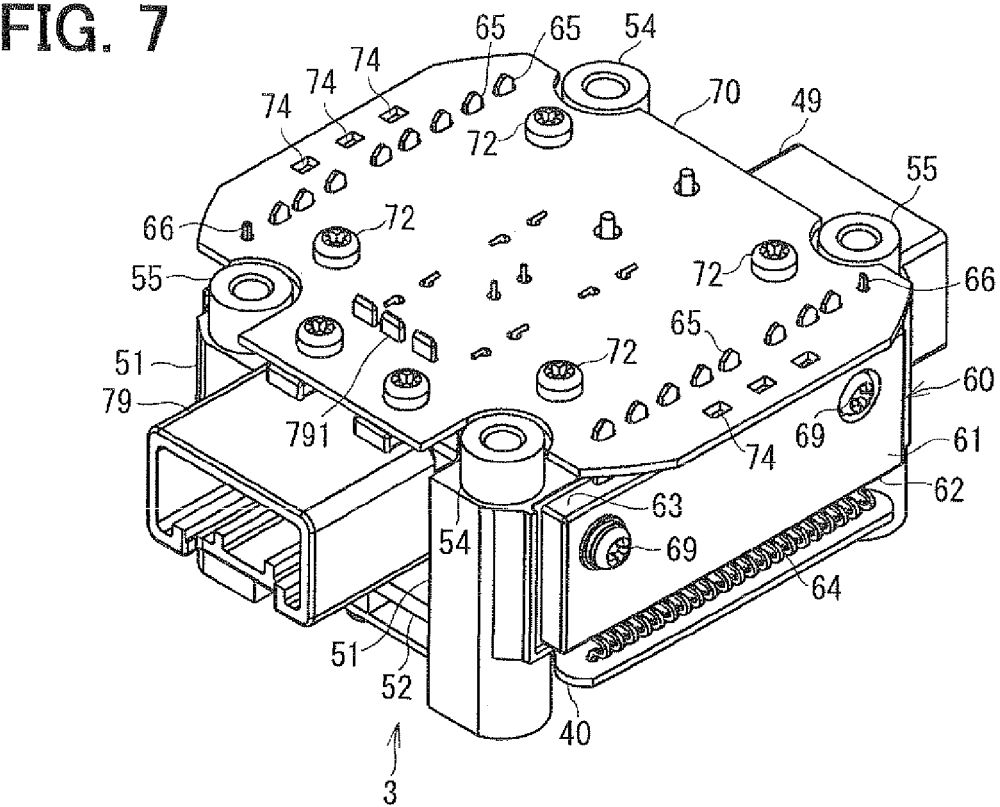
FIG. 7 is a perspective view of a control unit according to the first embodiment of the present invention.
Figure 8:
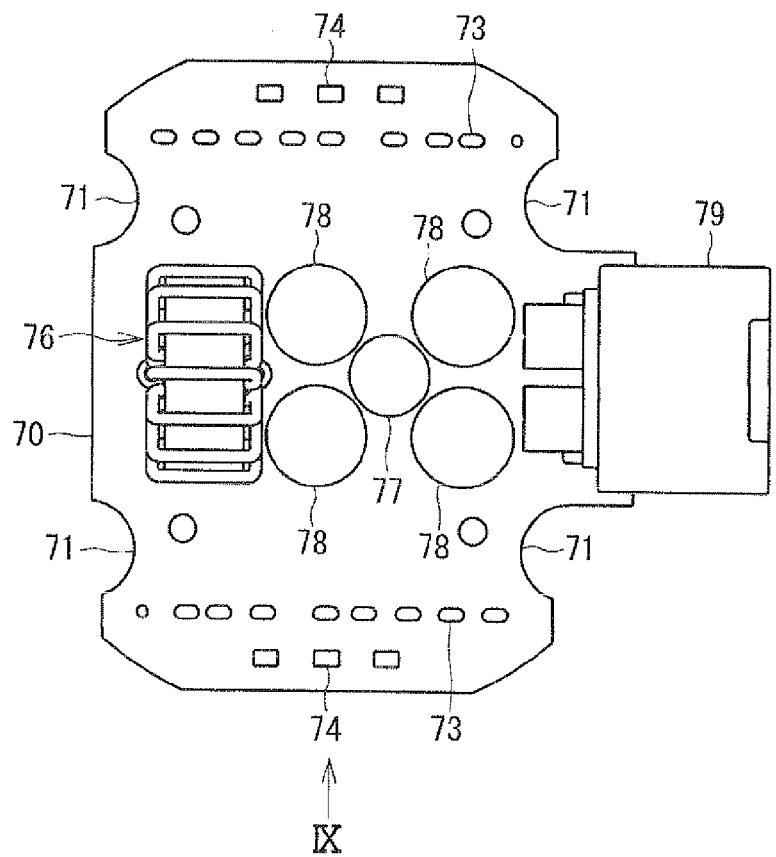
FIG. 8 is a plan view of a power circuit substrate according to the first embodiment of the present invention.
Figure 9:
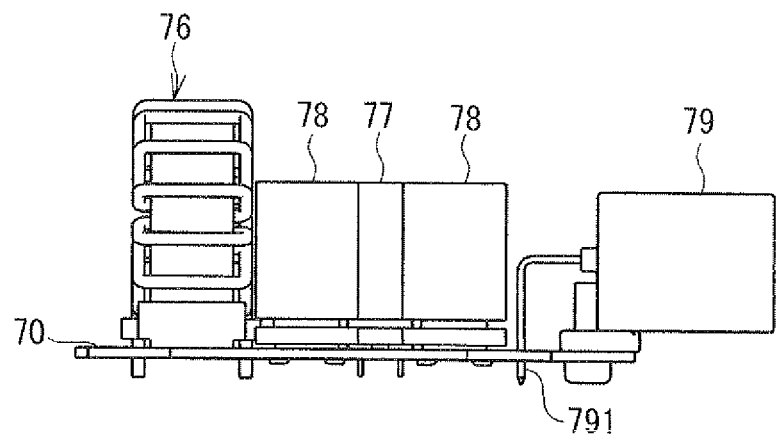
FIG. 9 is a side view of the power circuit substrate viewed in a direction IX in FIG. 8.
Figure 10:
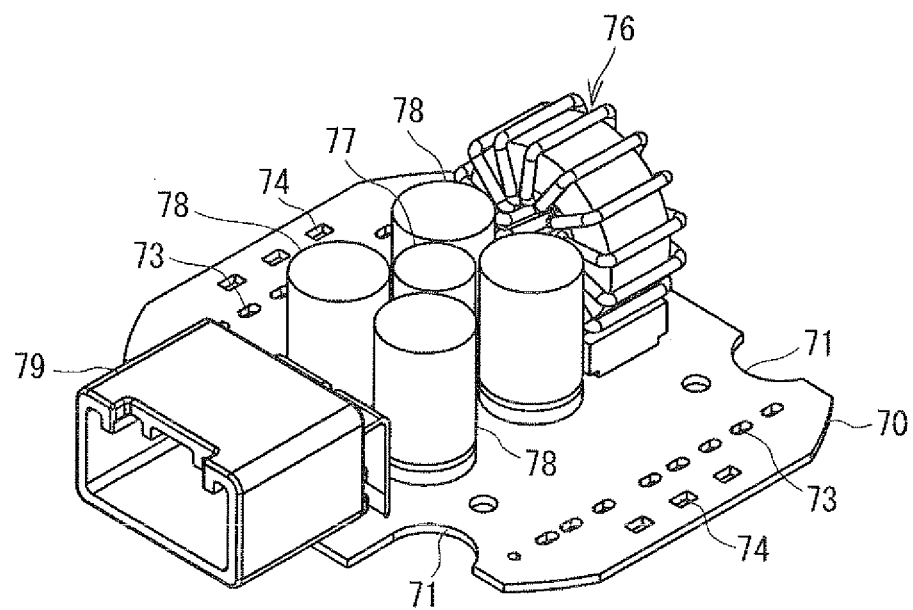
FIG. 10 is a perspective view of the power circuit substrate according to the first embodiment of the present invention.
Figure 15:
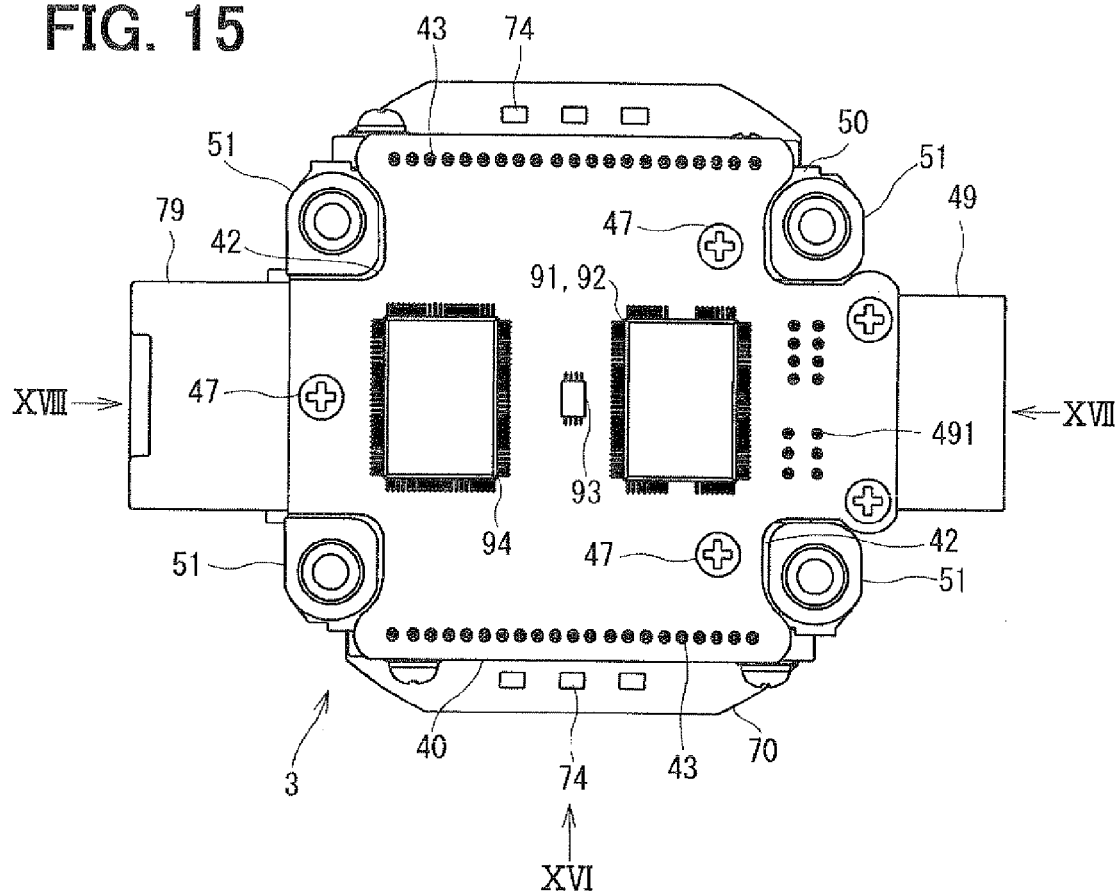
FIG. 15 is a plan view of the control unit according to the first embodiment of the present invention.
Figure 16:
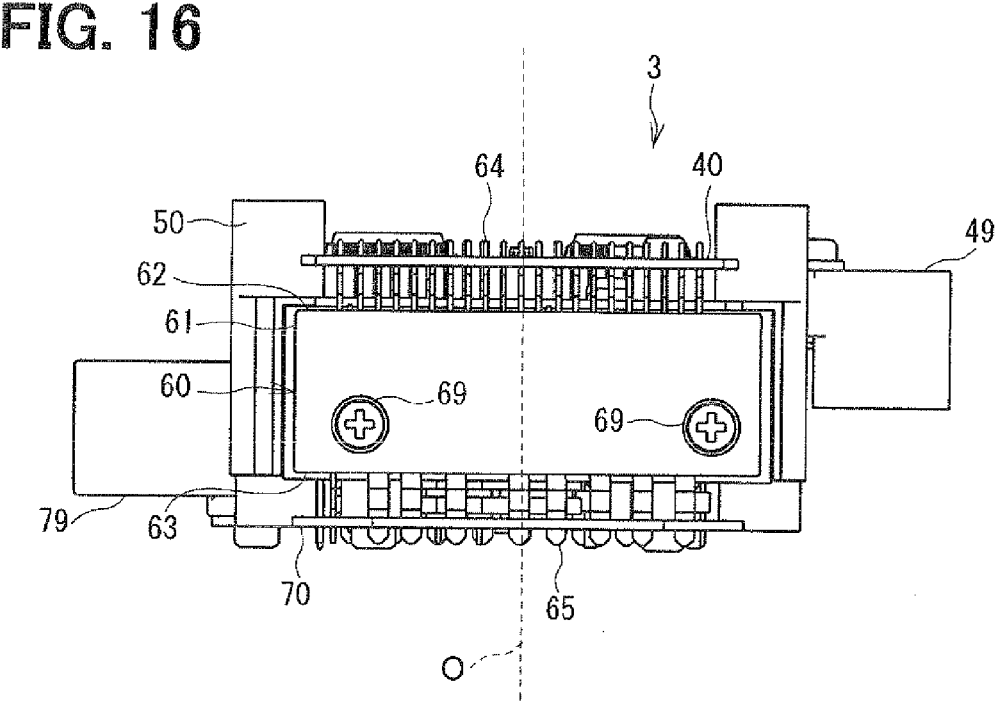
FIG. 16 is a side view of the power circuit substrate viewed in a direction XVI in FIG. 15.
Figure 17:
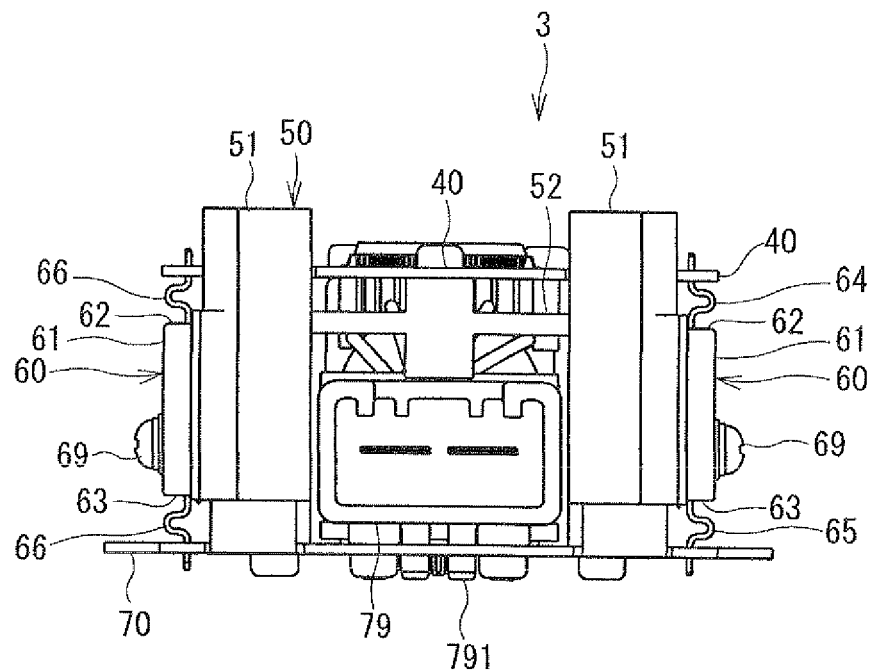
FIG. 17 is a side view of the power circuit substrate viewed in a direction XVII in FIG. 15.
Figure 18:
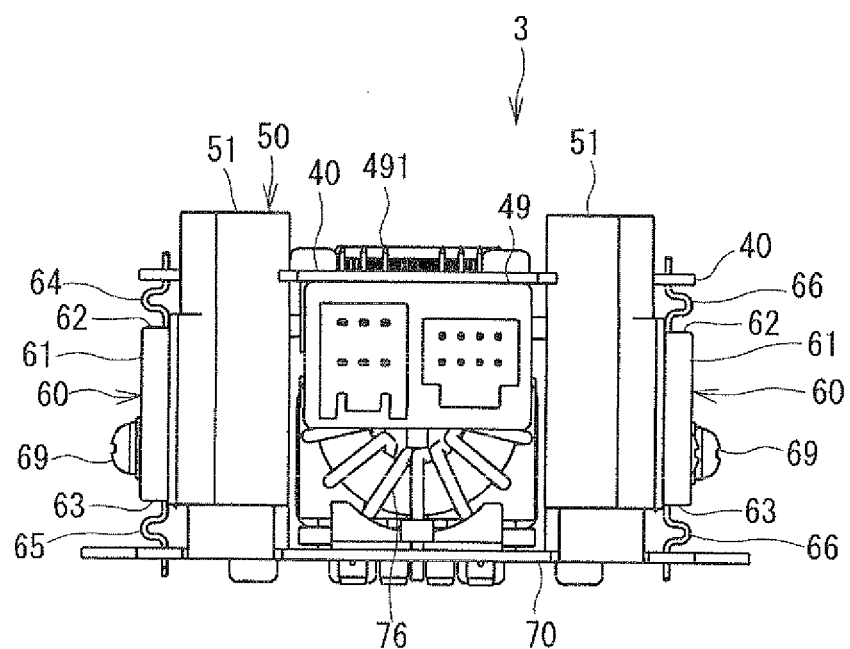
FIG. 18 is a side view of the power circuit substrate viewed in a direction XVIII in FIG. 15.

The control device 3 is described next with reference to FIG. 7 to FIG. 18. FIG. 7 shows entirety of the control device 3. FIGS. 8 to 10 show the power circuit substrate 70, FIGS. 11 to 14 show the heat sink 50 and the power module 60, FIG. 15 shows the control circuit substrate 40, and FIGS. 16 to 18 show arrangement of a control circuit connector 49 and a power circuit connector 79. The control device 3 is provided within a motor case area in a radial direction of the motor 2. The motor case area is formed when the motor case 10 is projected in the axial direction. As shown in FIG. 7, the control device 3 has the power circuit substrate 70, the heat sink 50, the power module 60, the control circuit substrate 40, the power circuit connector 79 and the control circuit connector 49.

The power circuit substrate 70 is a substrate of four layers, which is made of glass epoxy plate, for example, and has thick pattern copper foils. Four corners of the power circuit substrate 70 have four notches 71 to assure spaces for connection parts 55 of the heat sink 50. The power circuit substrate 70 is screw-fitted to the heat sink 50 by screws 72 from a side, which is opposite to the motor 2, that is, toward the motor 2 side.

Power supply wirings are formed on the power circuit substrate 70 to supply the drive currents for driving the motor 2. The power circuit substrate 70 is formed with wirings, which have a wiring for connecting the U-phase FET 81, the V-phase FET 82 and the W-phase FET 83 at the power supply line side, a wiring far connecting the U-phase FET 84, the V-phase FET 85 and the W-phase FET 86 at the ground side, a wiring for connecting the power supply relays 87, 88 and the FET 81 to 83, and a wiring for connecting the power supply relay 87, the choke coil 76 and the smoothing capacitor 77.

Through holes 73 are formed on the power circuit substrate 70 so that power terminals 65 of the power module 60 are inserted. Through holes 74 are formed outside the through holes 73 of the power circuit substrate 70 so that the motor leads 27 are inserted. The motor leads 27 are inserted into the through holes 74 and electrically connected to the power circuit substrate 70 by soldering or the like. The motor leads 27 are thus connected electrically to the power module 60 through the power circuit substrate 70.

As shown in FIG. 8 to FIG. 10, the choke coil 76, the smoothing capacitor 77 and the electrolytic capacitors 78 are mounted on a surface of the power circuit substrate 70 on the motor 2 side and between the control circuit substrate 40 and the power circuit substrate 70. The choke coil 76, the smoothing capacitor 77, the electrolytic capacitors 78 and the power module 60 form the power circuit 100. The choke coil 76 is formed in a cylindrical or ring shape, which has a length in an axial direction shorter than a length in a radial direction. The choke coil 76 is located at a position, which does not overlap the shaft 35 when viewed in the axial direction of the motor 2. The choke coil 76 is arranged longitudinally and sandwiched between two heat radiation blocks 51 of the heat sink 50 so that its axial line is perpendicular to the axial center line of the shaft 35 as shown in FIG. 5 and FIG. 6.

The smoothing capacitor 77 is located at a substantial center among four electrolytic capacitors 78. The four electrolytic capacitors 78 are arranged to closely surround the smoothing capacitor 77 in the radial direction of the motor 2. The smoothing capacitor 77 and the four electrolytic capacitors 78 are located in a space formed between a plate-like connection part 52 of the heat sink 50 and the power circuit substrate 70 and between two heat radiation blocks 51 of the heat sink 50 as shown in FIG. 5 and FIG. 6.

Figure 11:
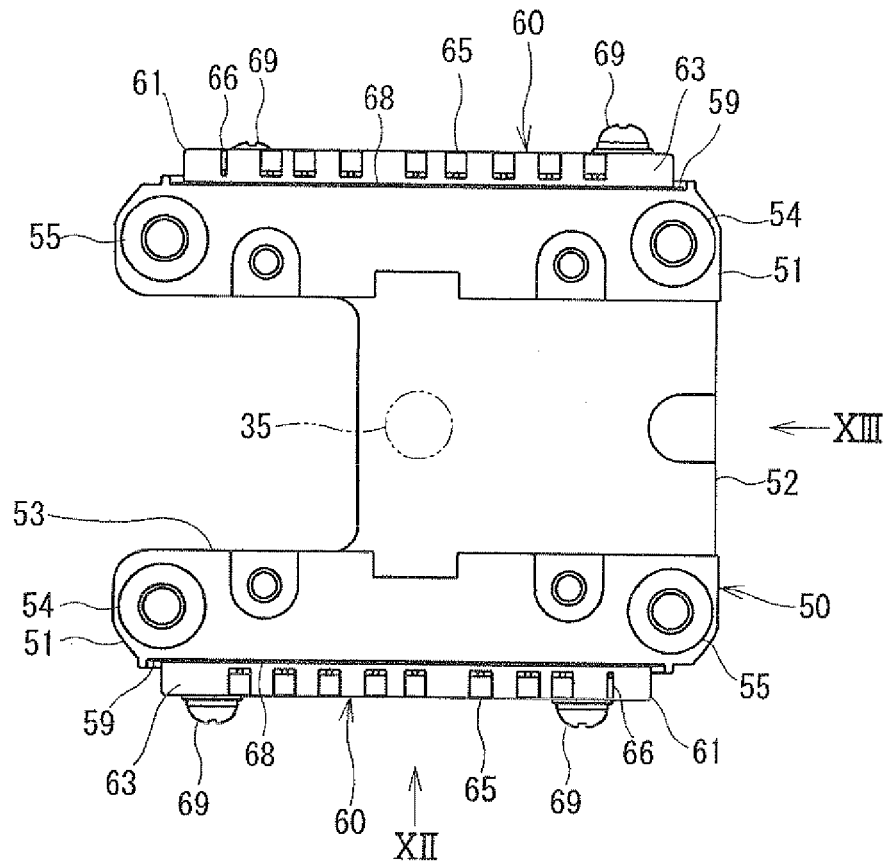
FIG. 11 is a plan view of the power circuit substrate, in which a power module is assembled to a heat sink, according to the first embodiment of the present invention.

The heat sink 50 and the power module 60 are described next with reference to FIG. 11 to FIG. 14. The heat sink 50 has, as shown in FIG. 11, two heat radiation blocks 51 as walls facing each other and the connection part 52 provided between the two heat radiation blocks 51. The two heat radiation blocks 51 and the connection part 52 are formed integrally of good thermal conductivity (for example, aluminum). The heat radiation blocks 51 are formed to be distanced or spaced apart from each other and located radially outside an imaginary extension line of the axial line of the shaft 35.

Figure 13:
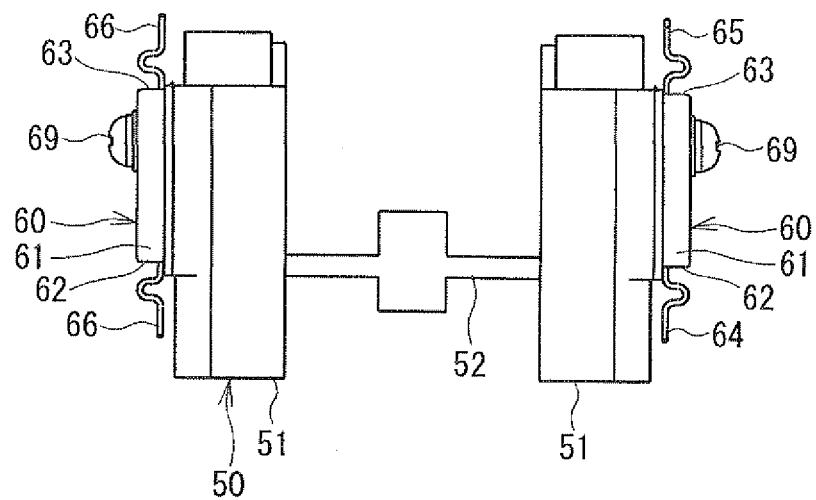
FIG. 13 is a side view of the power circuit substrate viewed in a direction XIII in FIG. 11.

The heat sink 50 is formed in an open-square shape when viewed in the axial direction of the motor 2. The radially inside surfaces of the two heat radiation blocks 51 and the connection part 52 form a concave part 53. The heat sink 50 is formed generally in an H-shape as shown in FIG. 13 when viewed in a direction XIII in FIG. 11.

Figure 14:
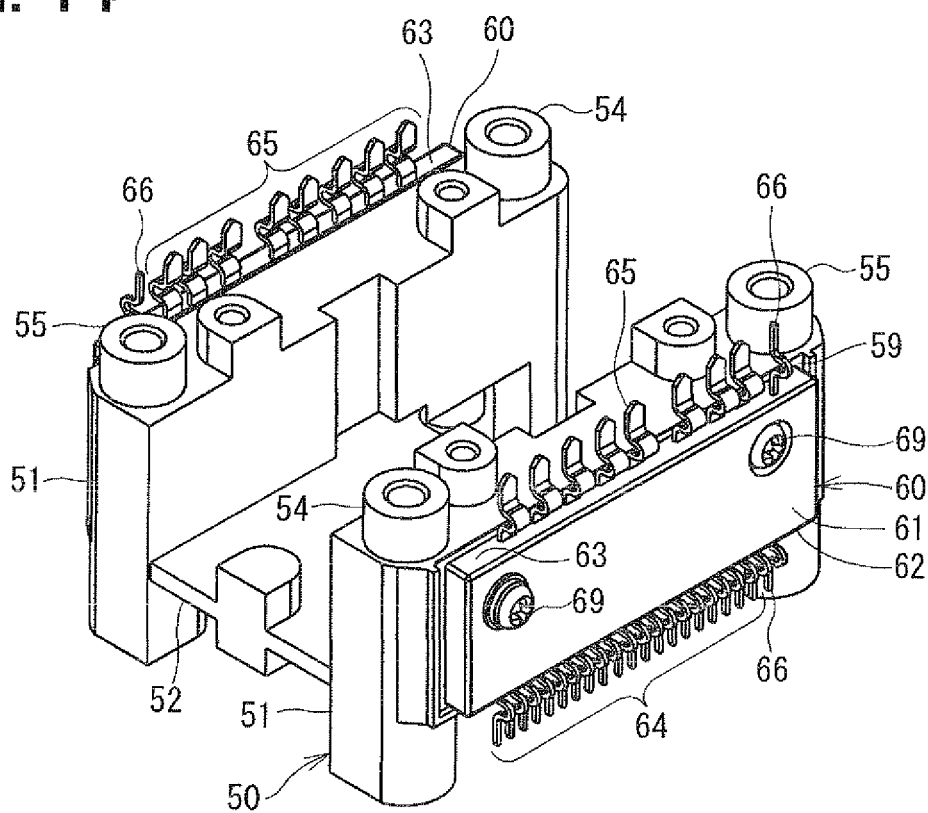
FIG. 14 is a perspective view of the power circuit substrate, in which the power module is assembled to the heat sink, according to the first embodiment of the present invention.

The heat radiation blocks 51 are each formed in a wide column shape as shown in FIG. 14. Each heat radiation block 51 has connection parts 54 and 55 at its both ends. The connection parts 54 and 55 are formed through holes in the axial direction of the motor 2. As shown in FIG. 5 and FIG. 6, a screw 56 is inserted in the connection part 54 and screw-fitted to the motor case 10. Further, a screw 57 is inserted in the connection part 55 and screw-fitted to the motor case 10 together with a cover 110. The connection part 54 of one heat radiation block 51 and the connection part 54 of the other heat radiation block 51 are arranged to be in point-symmetry relative to the center line of the shaft 35. Similarly, the connection part 55 of one heat radiation block 51 and the connection part 55 of the other heat radiation block 51 are arranged to be in point-symmetry relative to the center line of the shaft 35.

Figure 12:
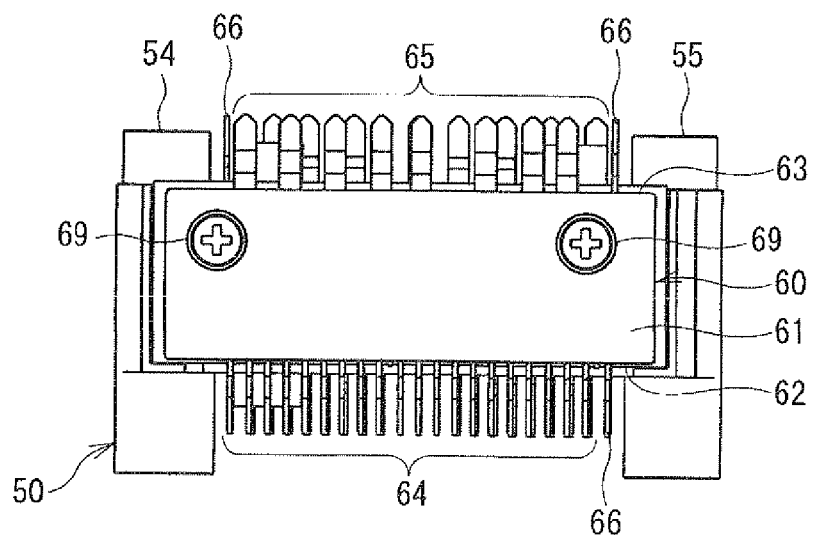
FIG. 12 is a side view of the power circuit substrate viewed in a direction XII in FIG. 11.

A heat receiving surface 59, which is a wide wall surface formed between the connection parts 54 and 55, is formed on the radially outside surface of the heat radiation block 51. As shown in FIG. 12, the heat receiving surface 59 is formed to be generally in parallel to the shaft 35.

The power module 60 is provided on a radially outside surface of the heat sink 50 in the radial direction of the motor 2 and disposed for each of the two heat radiation blocks 51 as shown in FIG. 11. The power module 60 has semiconductor chips, which form FETs of the switching elements and the power supply relay and is not shown, a mold part 61 for molding the semiconductor chips and the control terminals 64 and the power terminals 65, which protrude from the mold part 61. The mold part 61 is a rectangular body defined by two wide wall surfaces and four narrow end surfaces on the circumference of the wide wall surfaces.

As shown in FIG. 12, the control terminals 64 are formed to protrude from a first narrow end surface 62, which is perpendicular to the wide wall surface of the mold part 61. The power terminals 65 are formed to protrude from a second narrow end surface 63, which is perpendicular to the wide surface of the mold part 61 and faces the first narrow end surface 62 in parallel. The power module 60 is located along the heat receiving surface 59 of the heat sink 50. The first end surface 62, on which the control terminals 64 are formed, is at the control circuit substrate 40 side. The second end surface 63, on which the power terminals 65 are formed, is at the power circuit substrate 70 side. The power module 60 is located longitudinally, that is, in a manner raised in the axial direction, at the outside of the heat sink 50 in the radial direction of the motor 2.

The control terminals 64 are inserted into the through holes of the control circuit substrate 40 and electrically connected to the control circuit substrate 40 by soldering or the like. Control signals are outputted to the power module 60 from the control circuit substrate 40 through the control terminals 64. The power terminals 65 are inserted into the through holes 73 formed in the power circuit substrate 70 and electrically connected to the power circuit substrate 70 by soldering or the like. The drive currents for driving the motor 2 are supplied through the power terminals 65. Only small currents (for example, 1 A), which are required to control driving the motor 2, are supplied to the control circuit substrate 40 side. On the other hand, large currents (for example, 80 A), which are required to drive the motor 2, are supplied to the power circuit substrate 70 side. The power terminals 65 are formed thicker than the control terminals 64. A ground terminal 66 is formed to have the similar thickness as the control terminal 64. The ground terminal 66 is passed through the mold part 61 and connected to the control circuit substrate 40 and the power circuit substrate 70. The ground terminal 66 thus forms the ground of the control circuit substrate 40 side.

As shown in FIG. 11, a thin heat radiation sheet 68 is provided between the wide surface of the power module 60 and the heat receiving surface of the heat sink 50. The power module 60 is screw-fitted by screws 69 to the heat sink 50 together with the heat radiation sheet 68. Thus, the power modules 60 are fixed to the heat sink 50, particularly to the heat radiation blocks 51 through the heat radiation sheets 68 so that heat generated by current supply is radiated to the heat sink 50 through the heat radiation sheets 68. Although not shown, a part of the wiring pattern is exposed partly as a metallic heat radiation part from the mold part 61 on the surface of the power module 60, which is at the heat sink 50 side. Heat is thus radiated efficiently, because the metallic heat radiation part contacts the heat sink 50 through the heat radiation sheet 68. The heat radiation sheet 68 conducts heat from the power module 60 to the heat sink 50 and ensures insulation between the power module 60 and the heat sink 50.

The power module 60 mounts thereon the semiconductor chips, the shunt resistors 99 and the like on the wiring pattern formed of copper and is molded by the mold part 61 made of resin. The two power modules 60 are provided to form the inverter circuits 80 and 89 shown in FIG. 1, respectively.

The power modules 60 and the electric circuit shown in FIG. 1 are described here. One power module 60 corresponds to the inverter circuit 80 and has the FETs 81 to 86, the power supply relay 87, 88 and the shunt resistors 99 shown in FIG. 1. According to the present embodiment, the FETs 81 to 86, the power supply relay 87, 88 and the shunt resistors 99 are resin-molded into a single body. The other power module 60 corresponds to the inverter circuit 89 and has the FETs, the power supply relays and the shunt resistors, which form the inverter circuit 89. That is, according to the present embodiment, one power module 60 corresponds to an inverter circuit of one system. That is, according to the present embodiment, the power module 60 is provided to the heat radiation block 51 in each system.

The control circuit substrate 40 is a substrate of four layers formed of, for example, glass epoxy substrate and formed in a generally rectangular plate shape as shown in FIG. 15 so that it is within the motor case area. The four corners of the control circuit substrate 40 are formed four notches 42 for assembling the heat sink 50 to the motor case 10. The control circuit substrate 40 is also formed a plurality of through holes 43 along the outer periphery of both ends of longer sides. The through holes 43 are for connection to the control terminals 64 of the power module 60.

As shown in FIG. 15, a variety of electronic parts forming the control circuit 90 are mounted on the control circuit substrate 40. The pre-driver 91, the customized IC 92, the position sensor 93 and the microcomputer 94 are mounted on the surface of the control circuit substrate 40 at the motor 2 side. The position sensor 93 is provided at generally the center of the control circuit substrate 40 in facing relation to the magnet 36 of the shaft 35 as shown in FIG. 5 and FIG. 6. With this arrangement, rotation of the shaft 35 is detected by detecting changes in magnetic field provided by the magnet 36, which rotates with the shaft 35. The control circuit substrate 40 is screw-fitted to the heat sink 50 from the motor 2 side by screws 47.

The control circuit connector 49 and the power circuit connector 79 are described next with reference to FIG. 16 to FIG. 18. As shown in FIG. 16, the control circuit connector 49 and the power circuit connector 79 are located in point-symmetry relative to a predetermined point on the central axis line O of the shaft 35.

As shown in FIG. 17, the power circuit connector 79 is located between the control circuit substrate 40 and the power circuit substrate 70 so that it is electrically connected to the power circuit substrate 70 through a power circuit connector terminal 791. The power circuit connector 79 is located between the connection part 52 of the heat sink 50 and the power circuit substrate 70 in the axial direction of the motor 2 so that the wiring connected to the power source 75 is connectable from a radially outside of the motor 2. Thus, electric power is supplied to the power circuit substrate 70 through the power circuit connector 79. The electric power from the power source 75 is supplied to the coils 26 wound on the stator 20 through the power circuit connector 79, the power circuit substrate 70, the power module 60 and the motor leads 27.

As shown in FIG. 18, the control circuit connector 49 is located between the control circuit substrate 40 and the power circuit substrate 70 in the axial direction of the motor 2 to be electrically connected to the control circuit substrate 40 through the control circuit connector terminal 491. The control circuit connector 49 is located in the recess part 53 between the two heat radiation blocks 51 of the heat sink 50 to be connectable to the wiring from radially outside of the motor 2. Sensor information from the sensors is inputted and outputted to the control circuit substrate 40 through the control circuit connector 49.

The control device 3 is accommodated within the cover 110. The cover 110 is formed of magnetic material such as iron to prevent electric field and magnetic field from leaking from the control device 3 side to an external side and prevent dust from entering into the control device 3 side. The cover 110 has generally the same diameter as the motor case 10 and formed in a bottomed cylindrical shape, which opens to the motor 2 side. The cover 110 is screw-fitted to the motor case 10 together with the heat sink 50 by screws 57. Notches 111 are formed in the cover 110 at positions, which correspond to the control circuit connector 49 and the power circuit connector 79. The control circuit connector 49 and the power circuit connector 79 protrude from the notches 111 in the radial direction and open radially in different outward directions, for example, in opposite directions. A protrusion part 18 is formed on the resin guide 16 at a position, which corresponds to the notch 111 of the power circuit connector 79 side. A step part 19 is formed on the resin guide 16 to be fitted with the cover 110.

The drive apparatus 1 operates as follows. The microcomputer 94 provided on the control circuit substrate 40 generates a pulse signal through the pre-driver 91, which is formed by PWM control, to assist vehicle steering by the steering wheel 5 in accordance with a travel speed of a vehicle based on signals supplied from the position sensor 93, the torque sensor 8, the shunt resistors 99 and the like.

This pulse signal is outputted to the inverter circuits 80 and 89 of the two power supply systems formed by the power modules 60 through the control terminals 64 so that on/off switching operation of the FETs 81 to 86 of the power modules 60 are controlled. Thus sinusoidal wave currents, which are phase-shifted one another, are supplied to the coils 26 so that a rotating magnetic field is generated. The rotor 30 and the shaft 35 are rotated as a single body by the rotating magnetic field. With rotation of the shaft 35, driving force is outputted from the output end 37 to the gear 7 of the column shaft 6 so that steering operation of a driver by the column shaft 5 is assisted.

Heat generated at the time of switching the FETs 81 to 86 of the power module 60 is radiated to the heat sink 50 through the heat radiation sheet 68. Thus, failure or erroneous operation, which will otherwise be caused by temperature rise of the power module 60, is suppressed. The size of the stator 20, the rotor 30 and the like may be set in accordance with required power.

The drive apparatus 1 according to the first embodiment provides the following advantages.

(1) Since the control device 3 is located in the axial direction of the motor 2, the size of the drive apparatus 1 in the radial direction can be reduced. Since the motor 2 and the control device 3 are located by separating in the axial direction, the motor 2 and the control device 3 can be spaced apart relatively easily. Even if the output of the motor 2 need be changed, for example, it is only necessary to change heat mass of the heat sink 50. Thus, drive apparatuses of different specifications can be produced by using various parts in common. For example, if either one of the motor 2 and the control device 3 fails, only the motor 2 or the control device 3, which failed, can be replaced with ease.

(2) The power circuit substrate 70, which is required to supply large currents for driving the motor, and the control circuit substrate 40, which is related to only motor drive control and is not required to supply large currents, are spaced apart. The copper foil of the control circuit substrate 40 can thus be thinned.

(3) The heat sink 50 is located between the power circuit substrate 70 and the control circuit substrate 40, and the heat sink 50 is accommodated by effectively using the space between the power circuit substrate 70 and the control circuit substrate 40 in the axial direction of the motor 2. As a result, heat generated by the power circuit substrate 70 and the control circuit substrate 40 can be radiated efficiently by using one heat sink 50. The drive apparatus 1 can be reduced in size and improve its heat radiation.

(4) The power circuit connector 79 and the control circuit connector 49 are located between the power circuit substrate 70 and the control circuit substrate 40 in the axial direction of the motor 2. The power circuit connector 79 and the control circuit connector 49, which are comparatively large in size, can be accommodated efficiently by using the space between the power circuit substrate 70 and the control circuit substrate 40. The drive apparatus 1 can thus be reduced in size in its entirety.

(5) The choke coil 76, the smoothing capacitor 77 and the electrolytic capacitors 78 are located between the power circuit substrate 70 and the control circuit substrate 40 in the axial direction of the motor 2. The choke coil 76, the smoothing capacitor 77 and the electrolytic capacitors 78, which are comparatively large in size, can be accommodated efficiently by using the space between the power circuit substrate 70 and the control circuit substrate 40.

(6) The heat sink 50 has a plurality of heat radiation blocks 51 and hence provides an increased heat radiation area. The heat radiation of the heat sink 50 can be increased.

(7) The choke coil 76, the smoothing capacitor 77 and the electrolytic capacitors 78 are located between the plurality of heat radiation blocks 51 of the heat sink 50 in the radial direction of the motor 2. Heat radiation of the choke coil 76, the smoothing capacitor 77 and the electrolytic capacitors 78 can be promoted.

(8) The power circuit connector 79 and the control circuit connector 49 are provided to enable electric connection of wiring from the outside in the radial direction of the motor 2. As a result, operation of connecting electric wirings to the power circuit connector 79 and the control circuit connector 49 can be simplified and improved.

(9) The power circuit connector 79 and the control circuit connector 49 are located in point-symmetry relative to a predetermined point on the central axis line O of the shaft 35. Thus, the power circuit connector 79 and the control circuit connector 49 can be located in a distributed manner. Therefore, the protrusion of the connectors 49 and 79 in the radial direction of the motor 2 can be reduced and hence the control device 3 can be sized to be smaller. The bundle of wires connected to the power circuit connector 79 and the control circuit connector 49 is suppressed from being increased excessively and freedom of locating the wires can be increased.

(10) The entirety of the drive apparatus 1 can be sized small by arranging the power circuit connector 79 and the control circuit connector 49 among the plurality of heat radiation blocks 51 in the radial direction of the motor 2.

Second Embodiment

Figure 19:
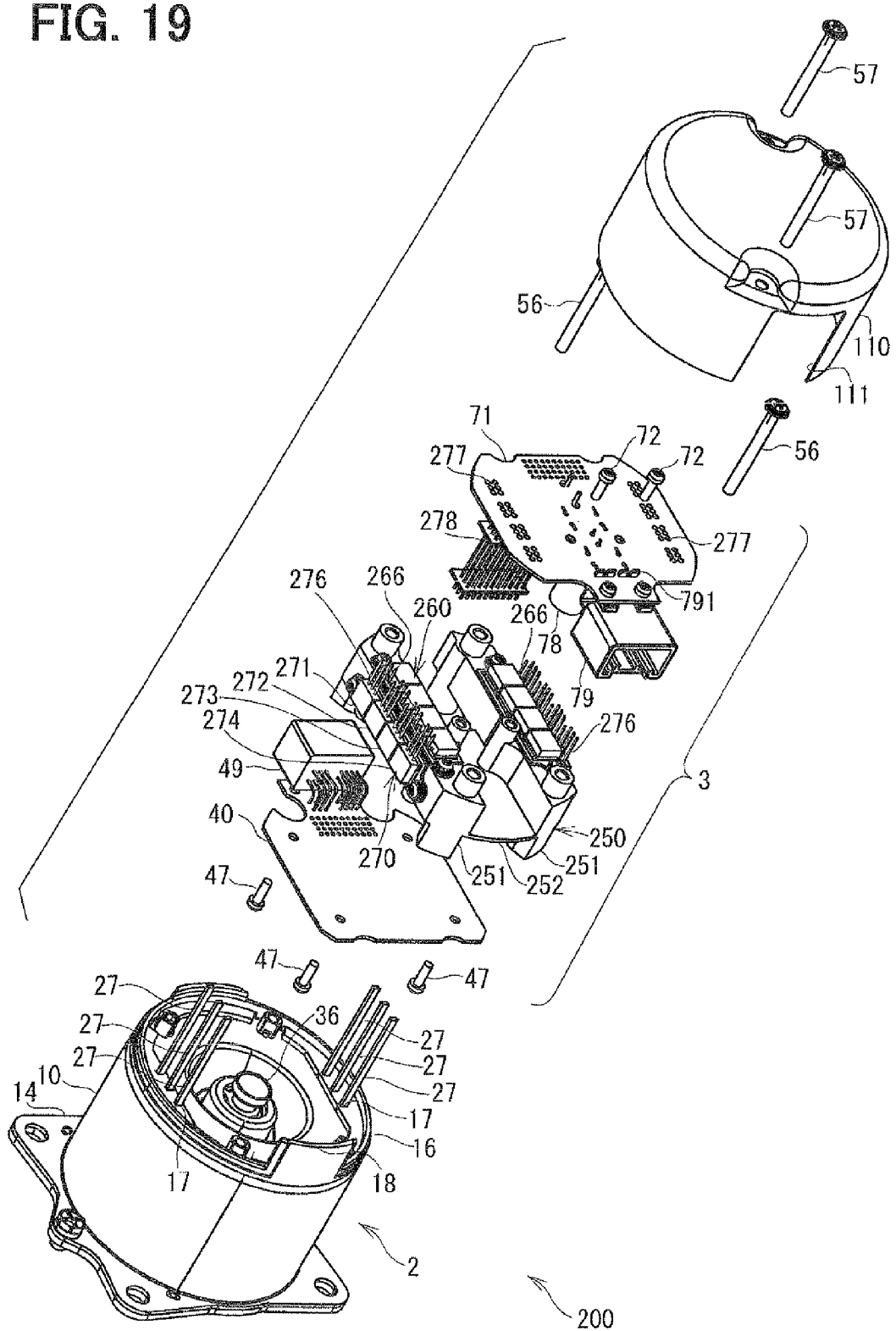
FIG. 19 is an exploded perspective view of a drive apparatus according to a second embodiment of the present invention.

A drive apparatus 1 according to a second embodiment is described with reference to FIG. 19. The second embodiment is different from the first embodiment in that module units 260 and 270 are arranged in a heat sink 250. The module units 260 and 270 form one power module, which corresponds to the power module 60.

Similarly to the first embodiment, the heat sink 250 has two heat radiation blocks 251 and a connection part 252, which is provided between the two heat radiation blocks 251 to connect the heat radiation blocks 251. The two heat radiation blocks 251 and the connection part 252 are integrally made of material having good heat conductivity (for example, aluminum). The heat radiation blocks 251 are formed to be spaced apart from each other.

The two module units 260 and 270 are arranged on one heat radiation block 251. One module unit 260 is arranged on a top surface of the heat radiation block 251, which are at the power circuit substrate 70 side. That is, the module unit 260 is arranged generally perpendicularly to the axial direction of the motor case 10. The other module unit 270 is arranged on a side surface of the heat radiation block 251 at a position, which is in a direction of rise of the heat radiation block 251 and in a radially outward direction of the motor 2. That is, the module unit 270 is located in the longitudinal direction relative to the end surface 13, which is formed in the axial direction of the motor case 10.

The module unit 260 has four semiconductor modules 261 to 264 and a wiring substrate 265. Each of the semiconductor modules 261 to 264 is formed with three terminals 266 on a narrow surface, which is perpendicular to a wide surface. The terminals 266 of the semiconductor modules 261 to 264 are arranged to protrude in the radially outward direction of the motor 2. The terminals 266 are bent at generally a right angle toward the power circuit substrate 70 side.

The module unit 270 has four semiconductor modules 271 to 274 and a wiring substrate 275. Each of the semiconductor modules 271 to 274 has three terminals 276 on a narrow surface, which is perpendicular to a wide surface. The terminals 276 of the semiconductor modules 271 to 274 are arranged to protrude in the axial direction of the motor 2, that is, generally perpendicularly to the power circuit substrate 70.

Each of the semiconductor modules 261 to 264 and 271 to 274 has one FET. The module units 260 and 270 arranged in the longitudinal direction on one heat radiation block 251 correspond to the inverter circuit 80. The module units 260 and 270 arranged on the other heat radiation block 251 correspond to the inverter circuit 89. Thus, one power module, which forms one drive system, is arranged relative to one heat radiation block 51. The inverter circuit 80 and the inverter circuit 89 are similar to each other as in the first embodiment.

The semiconductor modules 261 to 264 and 271 to 274 do not have terminals, which directly connect to the control circuit substrate 40. The control circuit substrate 40 and the power circuit substrate 70 are electrically connected by way of substrate connecting terminals 278. The control circuit substrate 40 and the semiconductor modules 261 to 264 and 271 to 274 are electrically connected by way of substrate connection terminals 278 and the power circuit substrate 70. Control signals outputted from the control circuit substrate 40 are supplied to the semiconductor modules 261 to 264 and 271 to 274 by way of the substrate connecting terminals 278 and the power circuit substrate 70 to control on/off of the FETs in the semiconductor modules 261 to 264 and 271 to 274. Thus, driving the motor 2 is controlled in the similar manner as in the first embodiment. The second embodiment provides the similar advantages (1) to (10), which the first embodiment provides.

Third Embodiment

Figure 20:
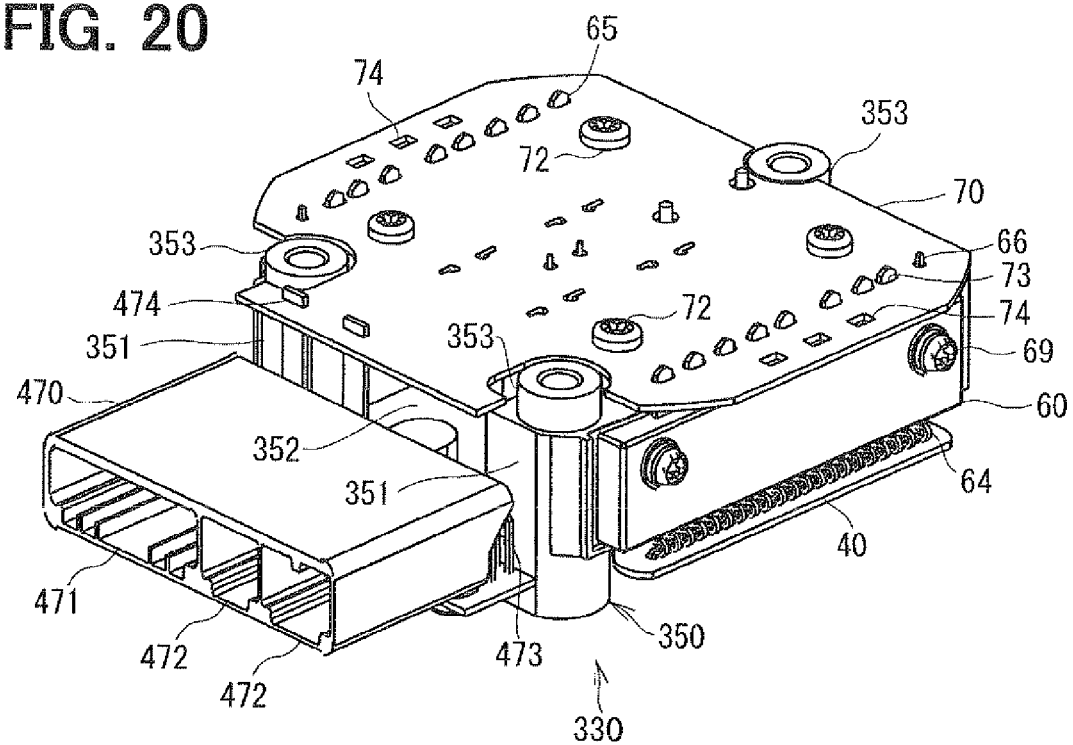
FIG. 20 is a perspective view of an electronic control unit according to a third embodiment of the present invention.
Figure 21:
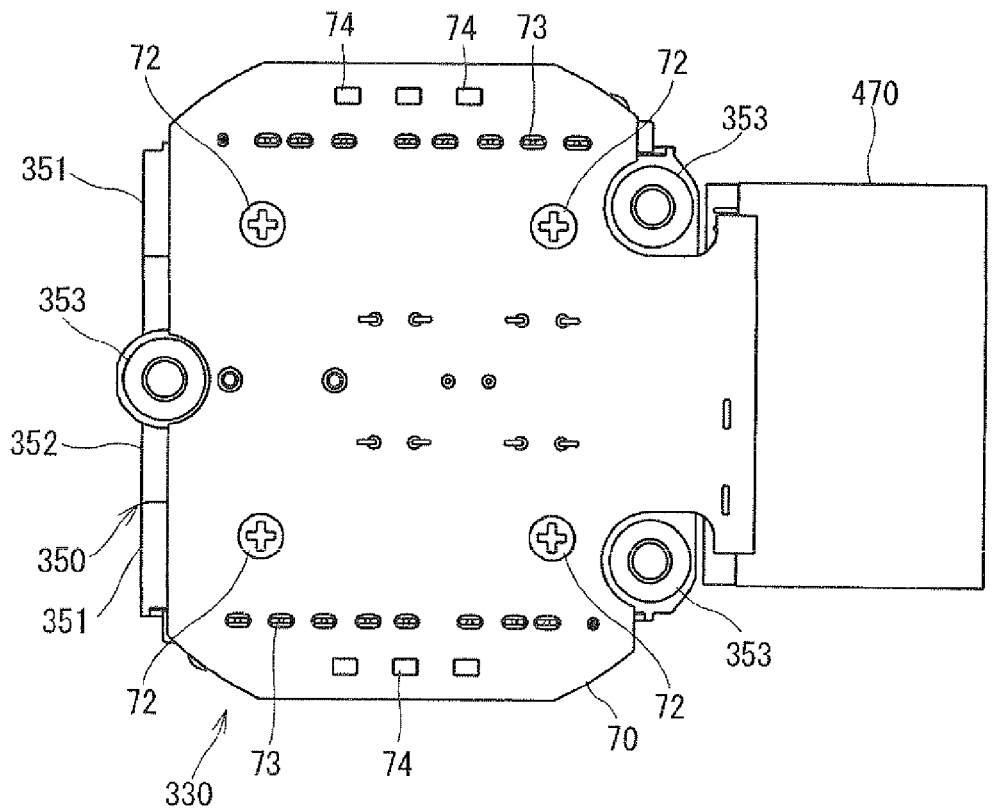
FIG. 21 is a plan view of the control unit according to the third embodiment of the present invention.

A drive apparatus according to a third embodiment of the present invention will be described with reference to FIG. 20 and FIG. 21. The third embodiment is different from the first embodiment in that a control device 330 uses a multi-function connector 470 in place of the power circuit connector 79 and the control circuit connector 49. The multi-function connector 470 is located between the power circuit substrate 70 and the control circuit substrate 40.

The control device 330 has the power circuit substrate 70, a heat sink 350, the power module 60, the control circuit substrate 40 and the multi-function connector 470. The heat sink 350, the power module 60 and the multi-function connector 470 are arranged between the power circuit substrate 70 and the control circuit substrate 40.

The heat sink 350 has two heat radiation blocks 351 and a connection part 352 formed between the two heat radiation blocks 251. The two heat radiation blocks 351 and the connection part 352 are formed integrally of material of good heat conductivity (for example, aluminum). The heat radiation blocks 351 are formed to be spaced apart from each other and in a wide columnar shape.

Connection parts 353 are formed at one end in a longitudinal direction of the heat radiation block 351 and at the other end in a longitudinal direction of the connection part 352. Through holes are formed in three connection parts 353 in the axial direction of the motor 30.

The multi-function connector 470 is located between the power circuit substrate 70 and the control circuit substrate 40 in the radial direction of the motor 2 so that its power circuit connector terminals 474 electrically connect to the power circuit substrate 70 and its control circuit connector terminals 473 electrically connect to the control circuit substrate 40. The multi-function connector 470 has a power connection opening 471, which opens to enable connection to wires for supplying electric power, and two signal connection openings 472, which open to enable connection to wires for inputting and outputting signals. The multi-function connector 470 is arranged between the power circuit substrate 70 and the control circuit substrate 40 so that the power connection opening 471 and the signal connection openings 472 enable connection of the wires in the same direction from radially outside the motor 2.

The third embodiment provides the similar advantages (1) to (8), which the first embodiment provides. According to the third embodiment, the multi-function connector 470, in which the power circuit connector 70 and the control circuit connector 40 of the foregoing embodiments are integrated into one, is provided. Thus, the number of parts can be reduced in comparison to the embodiments, in which the power circuit connector 70 and the control circuit connector 40 are provided as separate bodies.

Other Embodiments

According to the foregoing embodiments, the control units 3 and 330 are located at a position opposite to a gear box of the motor 2, which is coupled to the shaft end 37. However, the control device 3 and 330 may be located between the motor 2 and the gear box. In this case, the output end 37 of the shaft 35 is provided at a position opposite to the motor 2. That is, the shaft 35 extends from the motor 2 in a manner to pass through the heat sink 50, the control circuit substrate 40 and the power circuit substrate 70.

According to the foregoing embodiments, two heat radiation blocks 51, 251 and 351 of the heat sink 50, 250 and 350 are connected by the connection part 52, 252 and 352. The heat radiation blocks 51, 251 and 351 may be formed as separate blocks. Although the heat radiation blocks 51, 251 and 351 are preferably provided in correspondence to the inverter circuits 80 and 89, the number of the heat radiation blocks 51, 251 and 351 may be different from the number of the systems of the inverter circuits 80 and 89. The heat sink 50, 250 and 350 may have only one heat radiation block in the axial direction of the motor 2 and the power modules 60, 260 and 270 may be arranged on both side surfaces of the heat radiation block.

According to the foregoing embodiments, the control circuit substrate 40 is formed of a glass epoxy substrate as one example and the power circuit substrate 70 is formed of a glass epoxy substrate having thick copper foils as an example. However, the control circuit substrate 40 and the power circuit substrate 70 may be formed of any other types of substrates. According to the foregoing embodiments, the control circuit wiring part is provided by the control circuit substrate 40 and the power circuit wiring part is provided by the power circuit substrate 70. However, the control circuit wiring part and the power circuit wiring part may be provided by, for example, bus bars without using substrates.

The foregoing embodiments are described with reference to a three-phase AC control unit of one system or two systems. However, the control unit may be configured to correspond to three or more systems or to generate multi-phase AC power other than three phases. According to the foregoing embodiments, the drive apparatus 1 is described as being applied to an electric power steering system of a vehicle. The drive apparatus 1 may be applied to other systems.

The present invention is not limited to the foregoing embodiments and modification but may be implemented differently.

What is claimed is:

1. A drive apparatus comprising:
a motor having a motor case formed in a cylindrical shape to define an outer periphery, a stator located radially inside the motor case and including coils wound to provide a plurality of phases, a rotor located radially inside the stator and rotatable relative to the stator, and a shaft rotatable together with the rotor;
a heat sink located in an axial direction of the motor case;
a power module arranged on the heat sink to switch over current supply to the coils;
a control circuit wiring part arranged on the heat sink and electrically connected to the power module to supply a control current for controlling the motor;
a power circuit wiring part arranged on the heat sink at a position opposite to the control circuit wiring part and electrically connected to the power module to supply a drive current for driving the motor;
a control circuit connector electrically connected to the control circuit wiring part to input and output the control current; and
a power circuit connector electrically connected to the power circuit wiring part to input and output the drive current,
wherein the control circuit connector and the power circuit connector are located between the control circuit wiring part and the power circuit wiring part.

2. The drive apparatus according to claim 1, further comprising:
a capacitor electrically connected to the power circuit wiring part and located between the control circuit wiring part and the power circuit wiring part.

3. The drive apparatus according to claim 1, further comprising:
a choke coil electrically connected to the power circuit wiring part and located between the control circuit wiring part and the power circuit wiring part.

4. The drive apparatus according to claim 1, wherein:
the heat sink has a plurality of heat radiation blocks, which are formed to be spaced apart from each other.

5. The drive apparatus according to claim 4, wherein:
the control circuit connector and the power circuit connector are located between the plurality of heat radiation blocks.

6. The drive apparatus according to claim 1, wherein:
the control circuit connector and the power circuit connector are formed integrally into a single body.

7. The drive apparatus according to claim 1, wherein:
the control circuit connector and the power circuit connector are located in point-symmetry relative to a predetermined point on a central axis line of the motor case.

8. The drive apparatus according to claim 1, wherein:
the control circuit wiring part and the power circuit wiring part are spaced apart from each other in the axial direction of the motor; and
the control circuit connector and the power circuit connector open radially outward in opposite directions.

9. The drive apparatus according to claim 2, further comprising:
a choke coil electrically connected to the power circuit wiring part and located between the control circuit wiring part and the power circuit wiring part.

10. The drive apparatus according to claim 2, wherein:
the heat sink has a plurality of heat radiation blocks, which are formed to be spaced apart from each other.

11. The drive apparatus according to claim 10, wherein:
the control circuit connector and the power circuit connector are located between the plurality of heat radiation blocks.

12. The drive apparatus according to claim 2, wherein:
the control circuit connector and the power circuit connector are formed integrally into a single body.

13. The drive apparatus according to claim 2, wherein:
the control circuit connector and the power circuit connector are located in point-symmetry relative to a predetermined point on a central axis line of the motor case.

14. The drive apparatus according to claim 3, wherein:
the heat sink has a plurality of heat radiation blocks, which are formed to be spaced apart from each other.

15. The drive apparatus according to claim 14, wherein:
the control circuit connector and the power circuit connector are located between the plurality of heat radiation blocks.

16. The drive apparatus according to claim 3, wherein:
the control circuit connector and the power circuit connector are formed integrally into a single body.

17. The drive apparatus according to claim 3, wherein:
the control circuit connector and the power circuit connector are located in point-symmetry relative to a predetermined point on a central axis line of the motor case.

* * * * *